United States Patent
Lavoie et al.

(10) Patent No.: US 10,800,454 B2
(45) Date of Patent: Oct. 13, 2020

(54) TRAILER BACKUP ASSIST INPUT WITH GESTURE INTERFACE FOR MULTIPLE CONTROL MODES

(71) Applicant: Ford Global Technologies, LLC, Dearborn, MI (US)

(72) Inventors: Erick Michael Lavoie, Dearborn, MI (US); Robert Bell, New Hudson, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 595 days.

(21) Appl. No.: 15/613,991

(22) Filed: Jun. 5, 2017

(65) Prior Publication Data

US 2018/0346024 A1    Dec. 6, 2018

(51) Int. Cl.
*B62D 13/06* (2006.01)
*B62D 15/02* (2006.01)

(52) U.S. Cl.
CPC ........... *B62D 13/06* (2013.01); *B62D 15/027* (2013.01)

(58) Field of Classification Search
CPC .... B62D 13/06; B62D 15/027; Y10T 74/2084
USPC .................................................. 701/41, 36
See application file for complete search history.

(56) References Cited

U.S. PATENT DOCUMENTS

| | | | |
|---|---|---|---|
| 3,944,972 A | 3/1976 | Chandler | |
| 4,320,267 A | 3/1982 | Greve et al. | |
| 4,518,044 A | 5/1985 | Wiegardt et al. | |
| 4,848,499 A | 7/1989 | Martinet et al. | |
| 4,947,097 A | 8/1990 | Tao | |
| 5,261,495 A | 11/1993 | Szymczak | |
| 5,270,689 A | 12/1993 | Hermann | |
| 5,313,389 A | 5/1994 | Yasui | |
| 5,359,165 A | 10/1994 | Leveque et al. | |
| 5,430,261 A | 7/1995 | Malone | |
| 5,436,413 A | 7/1995 | Katakami | |
| 5,957,232 A | 9/1999 | Shimizu et al. | |
| 6,154,201 A | 11/2000 | Levin et al. | |

(Continued)

FOREIGN PATENT DOCUMENTS

| DE | 3923676 A1 | 1/1991 |
|---|---|---|
| DE | 3931518 A1 | 4/1991 |

(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Isaac G Smith
(74) *Attorney, Agent, or Firm* — Raymond Coppiellie; Price Heneveld LLP

(57) ABSTRACT

A steering input device for a trailer backup assist system includes a control element moveable away from a center position sequentially through a first sub-range and a second sub-range and defining a first stop between the first sub-range and the second sub-range, movement past the first stop being permitted upon a first predetermined movement of the control element. The steering input device further includes a controller generating a vehicle steering command based on a position of the control element.

20 Claims, 11 Drawing Sheets

(56) References Cited

U.S. PATENT DOCUMENTS

| | | |
|---|---|---|
| 6,389,342 B1 | 5/2002 | Kanda |
| 6,601,386 B1 | 8/2003 | Hori et al. |
| 6,636,197 B1 | 10/2003 | Goldenberg et al. |
| 6,750,406 B2 | 6/2004 | Komatsu et al. |
| 7,038,667 B1 | 5/2006 | Vassallo et al. |
| 7,085,634 B2 | 8/2006 | Endo et al. |
| 7,191,865 B2 | 3/2007 | Spark |
| 7,225,891 B2 | 6/2007 | Gehring et al. |
| 7,255,061 B2 | 8/2007 | Denton |
| 7,309,075 B2 | 12/2007 | Ramsey et al. |
| 7,310,084 B2 | 12/2007 | Shitanaka et al. |
| 7,315,299 B2 | 1/2008 | Sunda et al. |
| 7,436,298 B2 | 10/2008 | Yuasa et al. |
| 7,550,686 B2 | 6/2009 | Girke et al. |
| 7,827,917 B1 | 11/2010 | Henderson |
| 7,837,004 B2 | 11/2010 | Yasuda |
| 8,036,792 B2 | 10/2011 | Dechamp |
| 8,138,865 B2 | 3/2012 | North et al. |
| 8,519,948 B2 | 8/2013 | Cruz-Hernandez et al. |
| 8,755,984 B2 | 6/2014 | Rupp et al. |
| 8,786,417 B2 | 7/2014 | Holmen et al. |
| 8,798,860 B2 | 8/2014 | Dechamp |
| 8,825,328 B2 | 9/2014 | Rupp et al. |
| 8,909,426 B2 | 12/2014 | Rhode et al. |
| 8,930,140 B2 | 1/2015 | Trombley et al. |
| 8,972,109 B2 | 3/2015 | Lavoie et al. |
| 9,033,284 B2 | 5/2015 | Van Staagen |
| 9,102,271 B2 | 8/2015 | Trombley et al. |
| 9,108,598 B2 | 8/2015 | Headley |
| 9,132,856 B2 | 9/2015 | Shepard |
| 9,164,955 B2 | 10/2015 | Lavoie et al. |
| 9,187,124 B2 | 11/2015 | Trombley et al. |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,434,414 B2 | 9/2016 | Lavoie |
| 9,616,923 B2 | 4/2017 | Lavoie et al. |
| 9,623,904 B2 | 4/2017 | Lavoie et al. |
| 9,676,377 B2 | 6/2017 | Hafner et al. |
| 9,714,051 B2 | 7/2017 | Lavoie |
| 9,833,907 B1* | 12/2017 | Linnell ............... B25J 13/065 |
| 9,840,278 B2 | 12/2017 | Lavoie et al. |
| 2004/0093139 A1 | 5/2004 | Wildey et al. |
| 2004/0189595 A1 | 9/2004 | Yuasa |
| 2005/0000738 A1 | 1/2005 | Gehring et al. |
| 2006/0092129 A1 | 5/2006 | Choquet et al. |
| 2007/0198190 A1 | 8/2007 | Bauer et al. |
| 2008/0030361 A1 | 2/2008 | Peissner et al. |
| 2008/0312792 A1 | 12/2008 | Dechamp |
| 2009/0101429 A1 | 4/2009 | Williams |
| 2009/0306854 A1 | 12/2009 | Dechamp |
| 2010/0063670 A1 | 3/2010 | Brzezinski et al. |
| 2010/0152989 A1 | 6/2010 | Smith et al. |
| 2010/0222964 A1 | 9/2010 | Dechamp |
| 2011/0115754 A1* | 5/2011 | Cruz-Hernandez ...... G05G 1/08 345/184 |
| 2011/0149077 A1 | 6/2011 | Robert |
| 2011/0160956 A1 | 6/2011 | Chung et al. |
| 2012/0030626 A1 | 2/2012 | Hopkins et al. |
| 2012/0087480 A1 | 4/2012 | Yang et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2013/0006472 A1 | 1/2013 | McClain et al. |
| 2013/0024064 A1 | 1/2013 | Shepard |
| 2013/0158803 A1 | 6/2013 | Headley |
| 2013/0158863 A1 | 6/2013 | Skvarce et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0088797 A1 | 3/2014 | McClain et al. |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0057903 A1 | 2/2015 | Rhode et al. |
| 2015/0066296 A1 | 3/2015 | Trombley et al. |
| 2015/0070161 A1 | 3/2015 | Mizuno et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2016/0039456 A1 | 2/2016 | Lavoie et al. |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0280267 A1 | 9/2016 | Lavoie |
| 2016/0304122 A1 | 10/2016 | Herzog et al. |
| 2017/0073005 A1 | 3/2017 | Ghneim et al. |
| 2017/0101130 A1 | 4/2017 | Lavoie |
| 2017/0158233 A1* | 6/2017 | Herzog ................. B60K 37/06 |
| 2017/0183033 A1* | 6/2017 | Jaramillo-Moscoso ..................... B60K 35/00 |
| 2017/0259850 A1 | 9/2017 | Yamashita et al. |
| 2017/0297619 A1 | 10/2017 | Lavoie et al. |
| 2017/0297620 A1 | 10/2017 | Lavoie et al. |
| 2017/0313351 A1 | 11/2017 | Lavoie |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| DE | 102013000198 A1 | 7/2014 |
| EP | 0418653 A1 | 3/1991 |
| EP | 1653490 A1 | 5/2006 |
| EP | 1810913 A1 | 7/2007 |
| EP | 2388180 A2 | 11/2011 |
| EP | 1569073 B1 | 9/2014 |
| GB | 2398048 A | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |
| KR | 20140105199 A | 9/2014 |
| WO | 0044605 A1 | 8/2000 |

\* cited by examiner

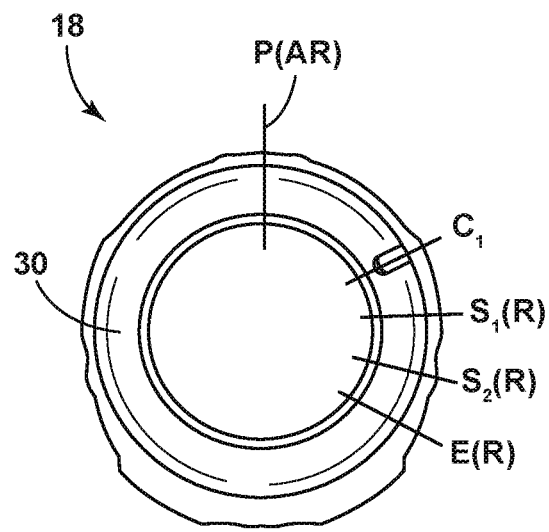 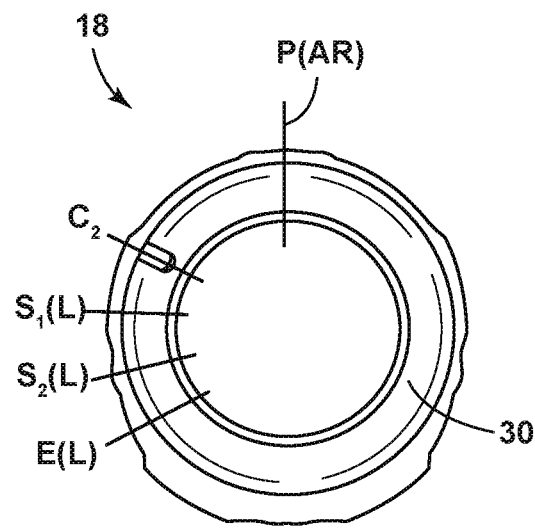
FIG. 10A                FIG. 10B
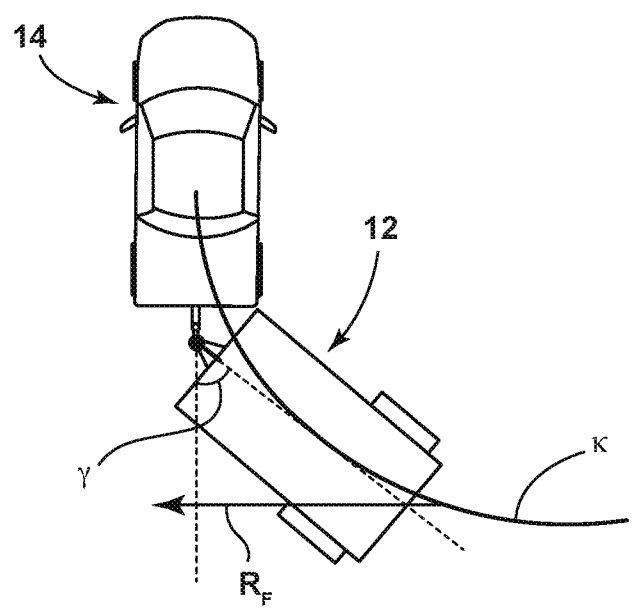
FIG. 11

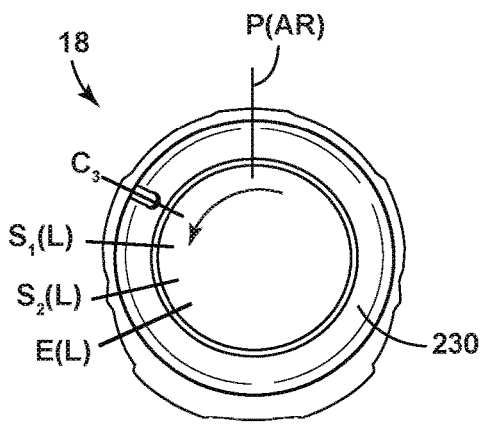
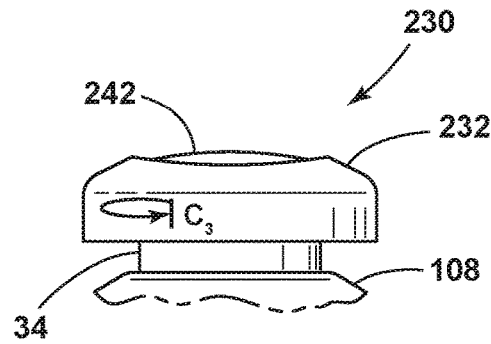
FIG. 15A  FIG. 15B
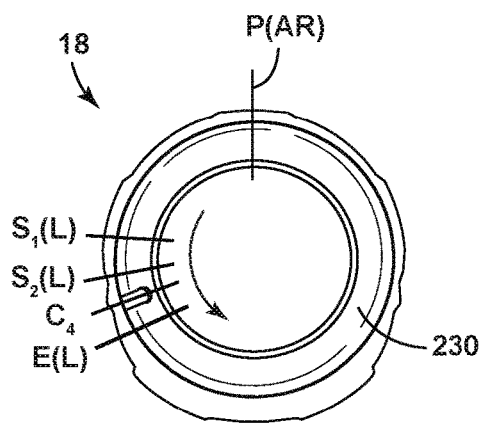
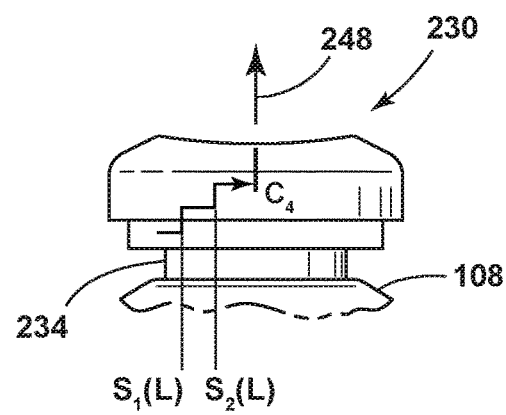
FIG. 16A  FIG. 16B
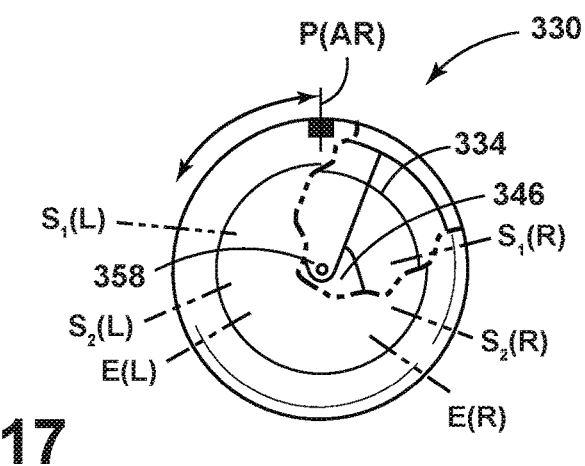
FIG. 17

TRAILER BACKUP ASSIST INPUT WITH GESTURE INTERFACE FOR MULTIPLE CONTROL MODES

FIELD OF THE DISCLOSURE

The present invention generally relates to steering assist technologies in vehicles and, more particularly, to a trailer backup assist system having a rotatable driver interface for controlling a radius of curvature for a trailer path.

BACKGROUND OF THE DISCLOSURE

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

Therefore, an approach for backing a trailer that provides a simple human machine interface and that overcomes other shortcomings of known trailer backup assist systems may be advantageous, desirable or useful.

SUMMARY OF THE DISCLOSURE

According to one aspect of the present disclosure, a steering input device for a trailer backup assist system includes a control element moveable away from a center position sequentially through a first sub-range and a second sub-range and defining a first stop between the first sub-range and the second sub-range, movement past the first stop being permitted upon a first predetermined movement of the control element. The steering input device further includes a controller generating a vehicle steering command based on a position of the control element.

Embodiments of this aspect can include any one or a combination of the following features:

the vehicle steering command is based on a curvature command corresponding to a position of the control element, the curvature command increasing from a zero curvature to a calculated maximum returnable curvature with movement of the control element from the center position through the first and second sub-ranges and the first sub-range corresponds to a first range of curvature commands below a predetermined threshold and the second sub-range corresponds to a second range of curvature commands above the predetermined threshold;

the predetermined threshold is based on a calculated relationship between the first and second ranges of curvature commands and a turn recovery distance;

the first and second ranges of curvature commands are mapped to the first and second sub-ranges of movement of the control element based on at least one known parameter of a vehicle-trailer combination associated with the steering input device;

the predetermined movement is movement of the control element from a lowered position to a raised position, the control element being aligned with and rotationally restricted by the first stop when in the lowered position and moveable into the second sub-range when in the raised position;

the input device further includes an electromechanical element coupled with the control element, the electromechanical element providing a force to define the first stop when the control element reaches the end of the first sub-range and removing the force upon the predetermined movement of the control element.

the control element is further moveable through a third sub-range beyond the second sub-range, and the control element further defines a second stop between the second sub-range and the third sub-range, movement of the control element past the second stop being permitted upon a second predetermined movement of the control element;

the vehicle steering command is based on a curvature command corresponding to a position of the control element, the curvature command increasing from a zero curvature to a calculated maximum returnable curvature with movement of the control element from the center position through the first and second sub-ranges, and the third sub-range corresponds to a curvature beyond the maximum returnable curvature to a physical maximum curvature;

the control element is biased toward the center position when within the first and second sub-ranges, and the control element maintains a release position when in the third sub-range; or the controller determines if a range of curvature from the maximum returnable curvature to the physical maximum curvature is above a predetermined range threshold before permitting movement past the second stop upon the second predetermined movement of the control element.

According to another aspect of the present disclosure, a backup assist system for a vehicle reversing a trailer includes a control knob rotatable away from a center position sequentially through a first sub-range and a second sub-range and defining a first stop between the first sub-range and the second sub-range, movement past the first stop being permitted upon a first predetermined movement of the control element. The system further includes a controller generating a vehicle steering command based on a position of the control knob.

According to another aspect of the present disclosure, a method for assisting in reversing a vehicle-trailer combination includes determining a range of a curvature command for the vehicle-trailer combination and separating the range of the curvature command into first and second sub-ranges below and above a predetermined threshold based on at least one known parameter of the vehicle-trailer combination. The method further includes and restricting movement of a control element for inputting the curvature command from the first sub-range to the second sub-range.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIGS. 10A and 10B show a variation of the rotatable knob of FIGS. 5 and 6 during a control sequence of the vehicle and trailer combination of FIG. 8 along the depicted path;

FIG. 11 is a further schematic view showing a vehicle backing a trailer along an alternative path requiring a forward-driving recovery path;

FIGS. 15A and 15B show the rotatable knob of FIGS. 10A and 10B during control of the vehicle and trailer combination of FIG. 12 along a third portion of the depicted path;

FIGS. 16A and 16B show the rotatable knob of FIGS. 10A and 10B during control of the vehicle and trailer combination of FIG. 12 along a fourth portion of the depicted path;

FIG. 17 shows a further variation of a control interface useable to control a vehicle in reversing a trailer.

DETAILED DESCRIPTION OF THE PREFERRED EMBODIMENTS

Figure 1:
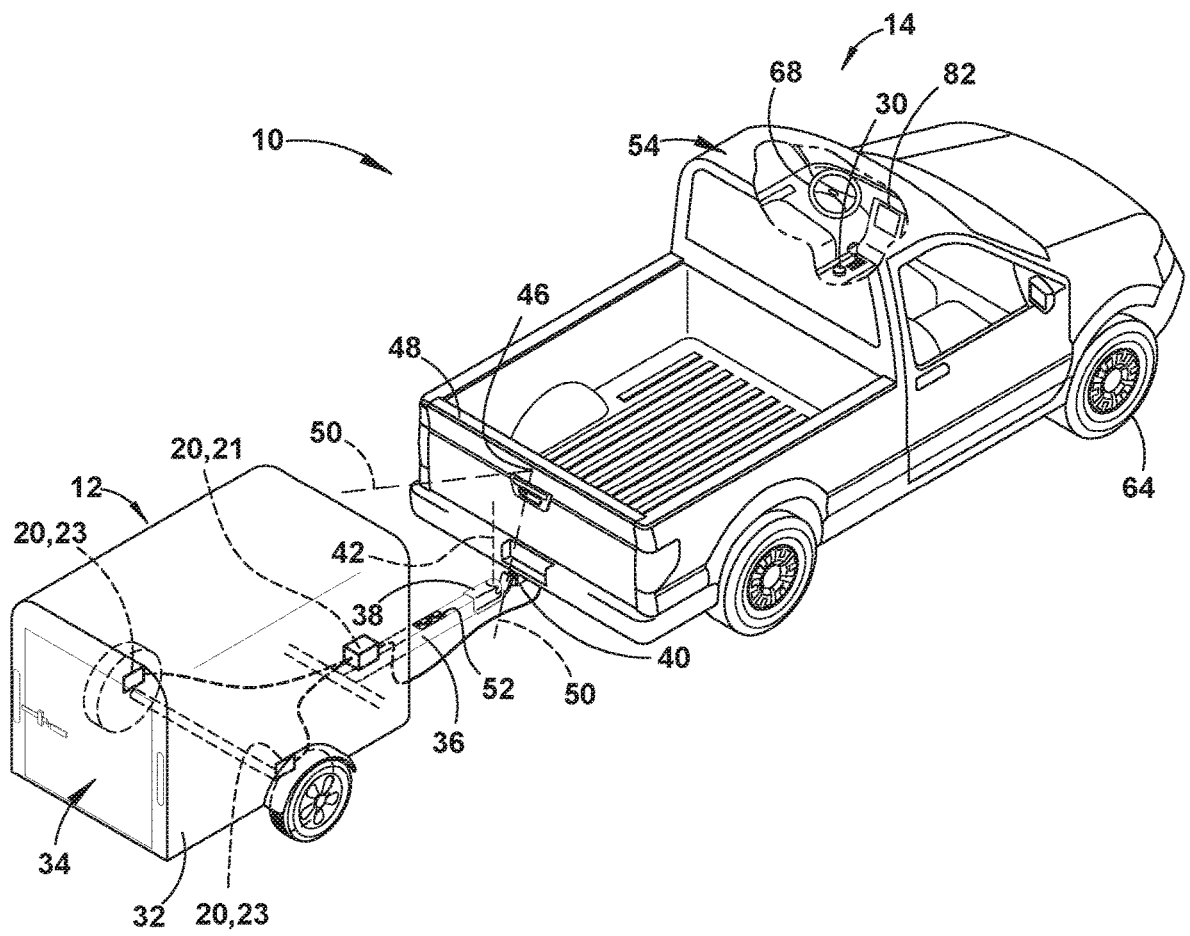
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-18, reference numeral 10 generally designates a trailer backup assist system for controlling a backing path 26 of a trailer 12 attached to a vehicle 14 by allowing a driver of the vehicle 14 to specify a desired curvature κ of the backing path 26 of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$, and a vehicle speed $v_1$. The controller 28 of the trailer backup assist system 10 may thereby estimates a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle γ and thereby further increase reliability of the overall estimated hitch angle γ.

With respect to the general operation of the trailer backup assist system 10, a steering input device 18 may be provided, such as a rotatable, or otherwise moveable, knob 30, for a driver to provide the desired curvature κ of the trailer 12. As such, the steering input device 18 may be operable between a plurality of selections, such as successive rotated positions of a knob 30, that each provide an incremental change to the desired curvature κ of the trailer 12. Upon inputting the desired curvature κ, the controller 28 may generate a steering command for the vehicle 14 to guide the trailer 12 on the desired curvature κ based on the estimated hitch angle γ and a kinematic relationship between the trailer 12 and the vehicle 14. Therefore, the accuracy of the hitch angle estimation is critical to operating the trailer backup assist system 10. However, it is appreciated that such a system 10 for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path 26 of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle and may have various shapes and sizes configured for different loads and items, such as a boat trailer or a flatbed trailer.

Figure 2:
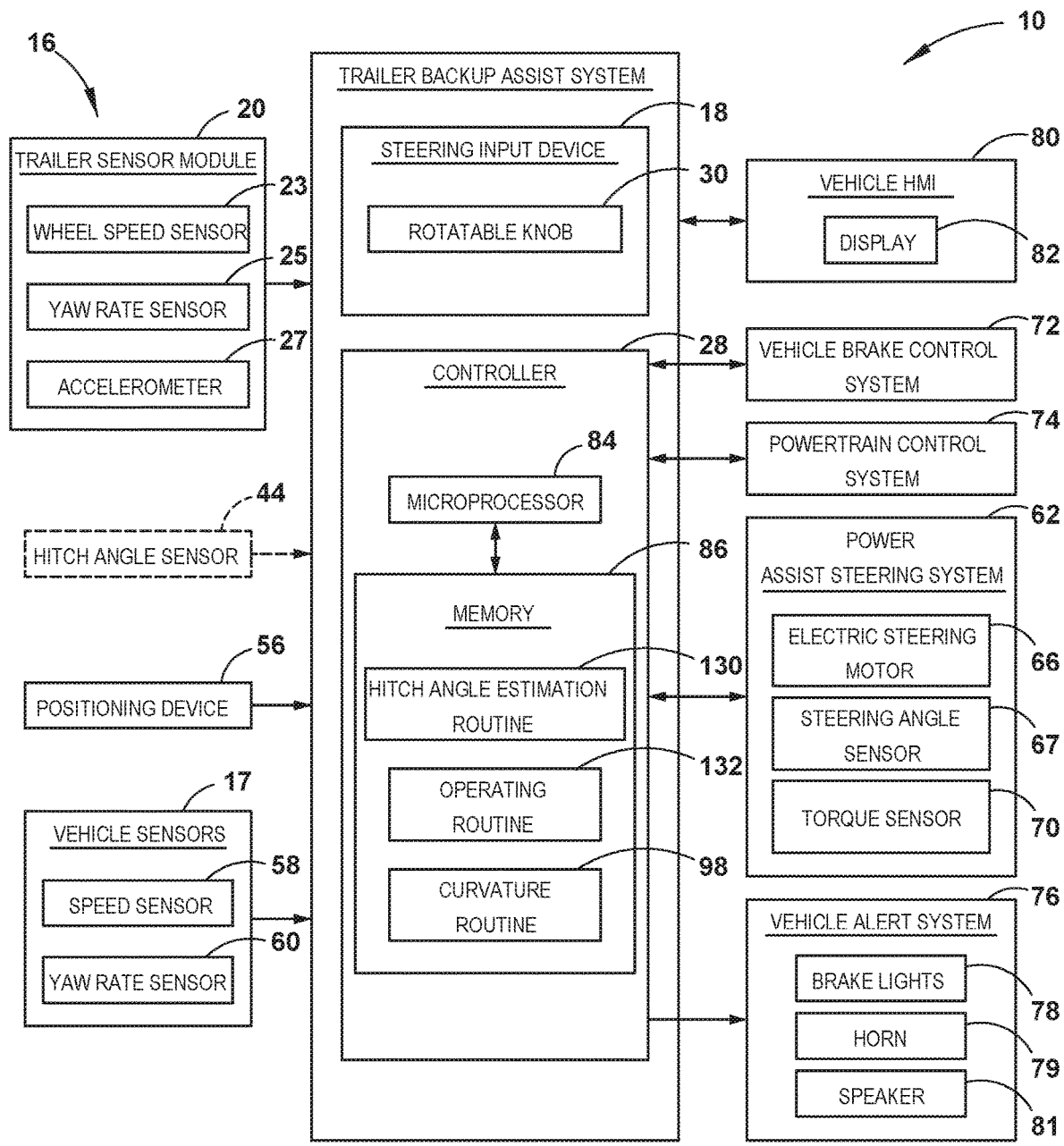
FIG. 2 is a block diagram illustrating one embodiment of the trailer backup assist system having a steering input device, a curvature controller, and a trailer braking system.

Referring to FIGS. 1 and 2, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer 12 or arranged parallel with the longitudinal and lateral directions of the trailer 12, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle 14 and trailer 12 status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate $\omega_1$ of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller 28 of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature κ of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Figure 6:
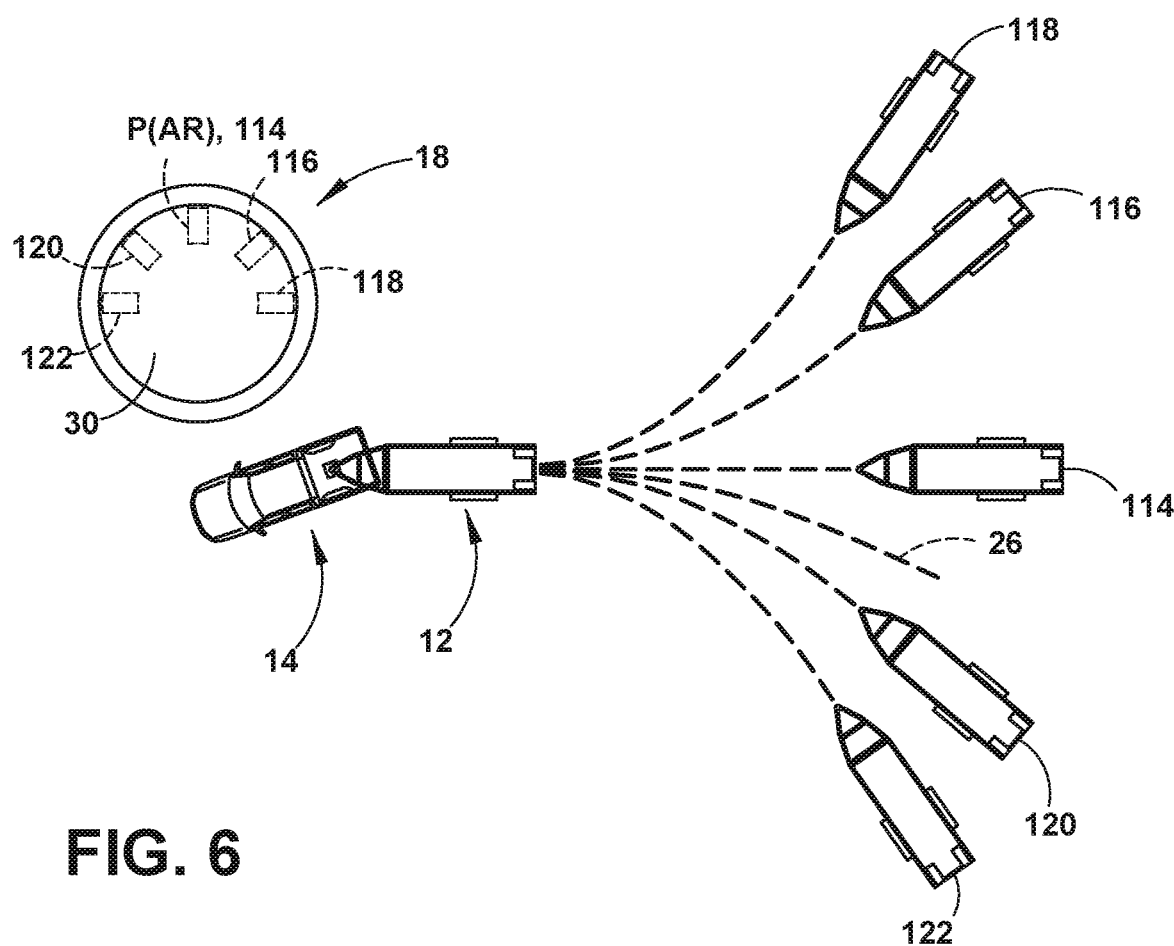
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature κ (FIG. 6). It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate $\omega_1$, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle γ on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path 26 of travel of the trailer 12 for the controller 28 to process and generate steering commands. More specifically, the steering input device 18 may provide a selection or positional information that correlates with a desired curvature κ of the desired backing path 26 of travel of the trailer 12. Also, the trailer steering commands provided by the steering input device 18 can include information relating to a commanded change in the path of travel, such as an incremental change in the desired curvature κ, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature κ. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature κ or other information defining a desired backing path 26, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, a trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
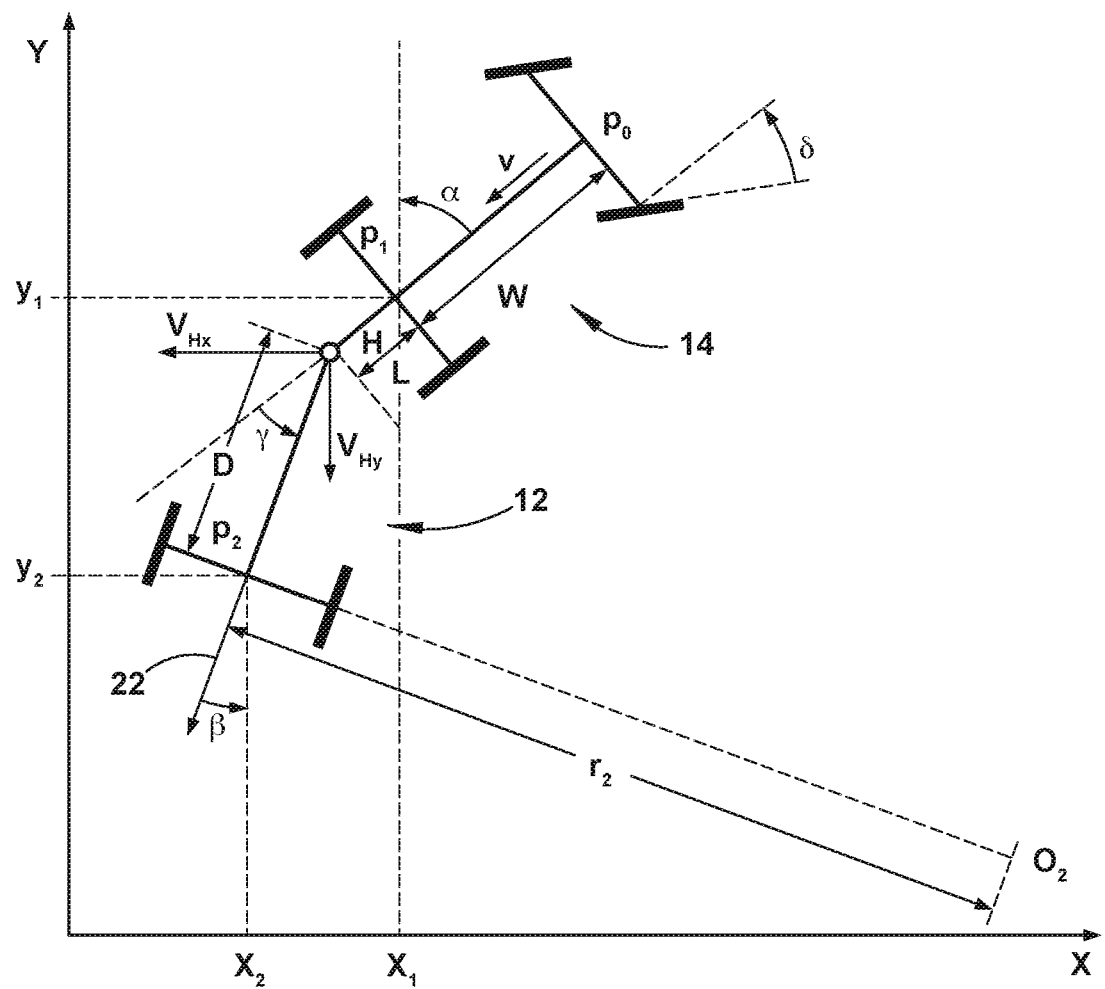
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. κ is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L (also referred to herein as the trailer length) between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue 36 configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue 36 configuration.

Figure 4:
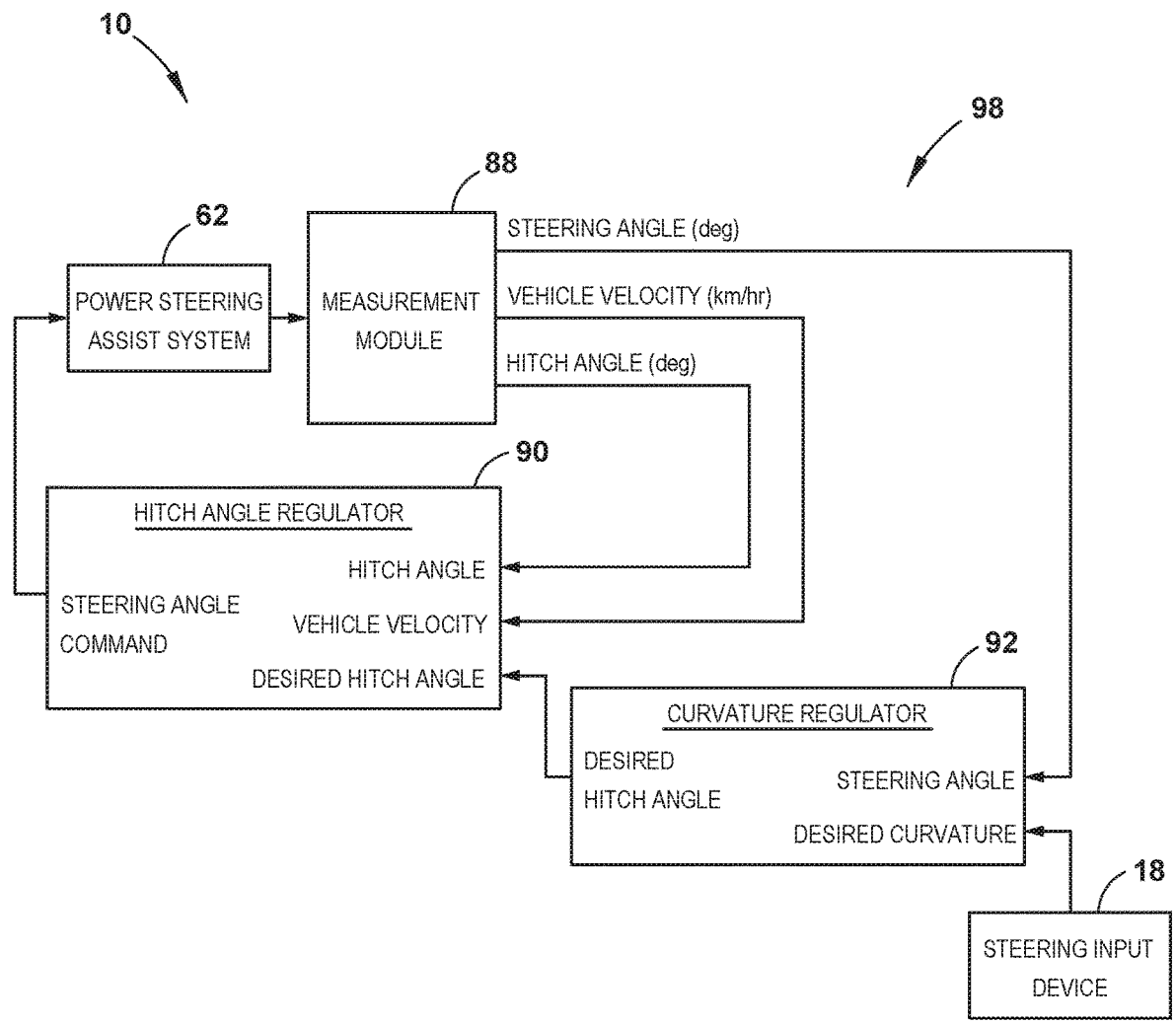
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 (FIG. 2) of the controller 28 (FIG. 2). In the illustrated layout, the steering input device 18 provides a desired curvature $\kappa_2$ value to the curvature regulator 92 of the controller 28, which may be realized in the desired backing path 26 by input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44 (FIG. 2), the vehicle speed sensor 58 (FIG. 2), the steering angle sensor 67 (FIG. 2), or alternatively the measurement module 88 may otherwise directly transmit data from the sensors without functioning as a memory device. Once the desired hitch angle γ(d) is computed by the curvature regulator 92, the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system 10. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system 10 is an input, $\kappa_2$, which represents the desired curvature κ of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

The output hitch angle of $p(\kappa_2, \delta)$ is provided as the reference signal, $\gamma_{ref}$, for the remainder of the control system 10, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, g(u, γ, v), is implemented with a proportional integral (PI) controller, whereby the integral portion substantially eliminates steady-state tracking error. More specifically, the control system 10 illustrated in FIG. 4 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller 28 or otherwise determined by the trailer backup assist system 10, as disclosed in greater detail herein.

Figure 5:
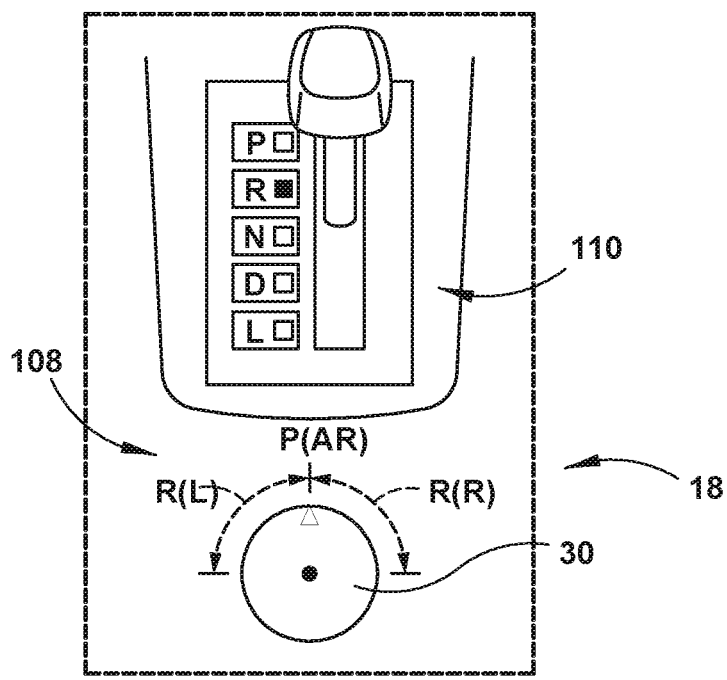
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired curvature κ of the trailer 12. More specifically, the angular position of the rotatable knob 30 may correlate with a curvature input C, such that rotation of the knob 30 to a different angular position provides a different commanded curvature κ with an incremental change based on the amount of rotation and, in some embodiments, a normalized rate, as described in greater detail herein.

The rotatable knob 30, as illustrated in FIG. 5, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one R(L) of the opposing rotational ranges of motion R(L), R(R). To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature κ output to the controller 28. The at-rest position P(AR) of the knob 30 corresponds to a signal indicating that the vehicle 14 should be steered such that the trailer 12 is backed along a substantially straight backing path 114 (FIG. 6) corresponding with a zero trailer curvature request from the driver), as defined by the longitudinal direction 122 of the trailer 12 when the knob 30 was returned to the at-rest position P(AR). A maximum clockwise and anti-clockwise position of the knob 30 (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature κ, within the available ranges of directional positions, while the driver of the vehicle 14 backs the trailer 12. In the illustrated embodiment, the rotatable knob 30 rotates about a central axis between a center or middle position 114 corresponding to a substantially straight backing path 26 of travel (i.e. zero curvature), as defined by the longitudinal direction 122 of the trailer 12, and various rotated positions 116, 118, 120, 122 on opposing sides of the middle position 114, commanding a desired curvature κ (which may be referred to as the "curvature command") corresponding to a radius of the desired backing path 26 of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 7:
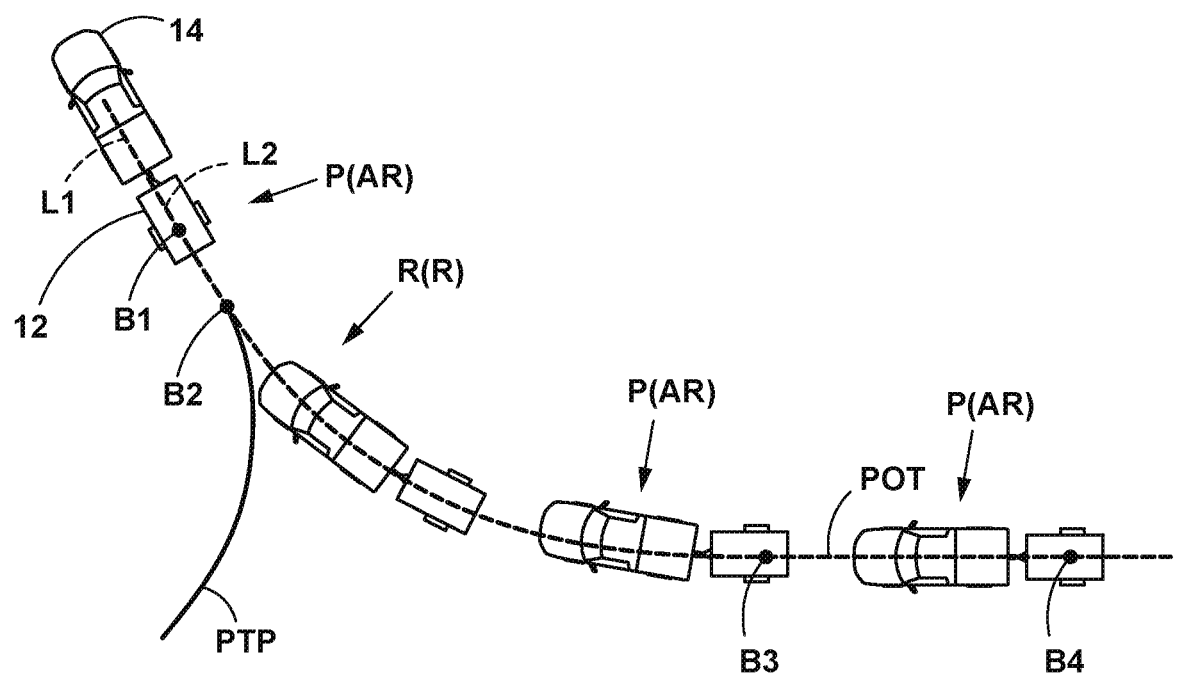
FIG. 7 is a schematic diagram showing a backup sequence of a vehicle and a trailer implementing various sequential curvature selections with the trailer backup assist system, according to one embodiment.

Referring to FIG. 7, an example of using the steering input device 18 for dictating a curvature κ of a desired backing path 26 of travel (POT), or portion thereof, of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axes L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 (FIG. 5) of the trailer backup steering input device 18 (FIG. 5) remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 122 (FIG. 6) of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 as necessary for causing the trailer 12 to be steered to the right as a function of an amount of rotation of the rotatable knob 30 with respect to the at-rest position P(AR), a rate movement of the knob 30, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary to cause the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 and the system 10 automatically steers as the driver reverses the vehicle 14. As discussed above, the driver may command the trailer backing path by using a steering input device 18 and the controller 28 may determine the vehicle steering angle to achieve the desired curvature κ, whereby the driver controls the throttle and brake while the trailer backup assist system 10 controls the steering.

Figure 8:
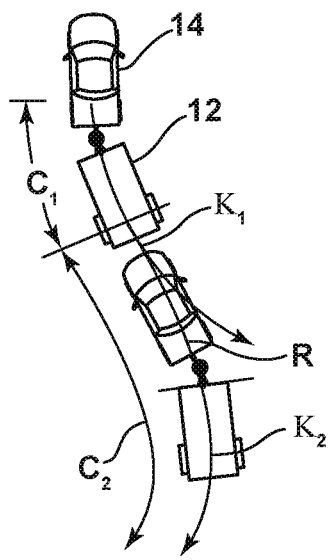
FIG. 8 is a schematic view showing a vehicle backing a trailer along a path including multiple curvatures with a recovery period therebetween.

Referring now to FIG. 8, a schematic view of a vehicle 14 reversing a trailer 12 is shown during a sequence of backing maneuvers implemented using a particular embodiment of the steering input device 18 (FIG. 6), including a rotatable knob 30 (FIG. 6), as described above. In this sequence, it is shown that upon initially reversing under a particular curvature command $C_1$ that corresponds with a curvature $κ_1$ of the combined trailer 12 and vehicle 14 (as implemented by system 10 by controlling the steering angle δ of the wheels 64 (FIG. 1) of vehicle 14, as described above), the combined trailer 12 and vehicle 14 will go through a recovery path R of a certain distance after a second curvature command $C_2$ is entered by the driver using knob 30. As shown, even when the subsequent curvature command $C_2$ is in a direction opposite the initial command $C_1$, a portion of the recovery path R will continue in the direction of $C_1$ as the path R transitions from the initially-commanded curvature $κ_1$ corresponding with command $C_1$ to reach the second commanded curvature $κ_2$ that corresponds with command $C_2$. Overall, the distance needed for the combined trailer 12 and vehicle 14 combination to achieve the second commanded curvature $κ_2$ represents a lag between the driver imputing the second curvature command $C_2$ and the corresponding curvature $κ_2$ being reached.

Figure 9:
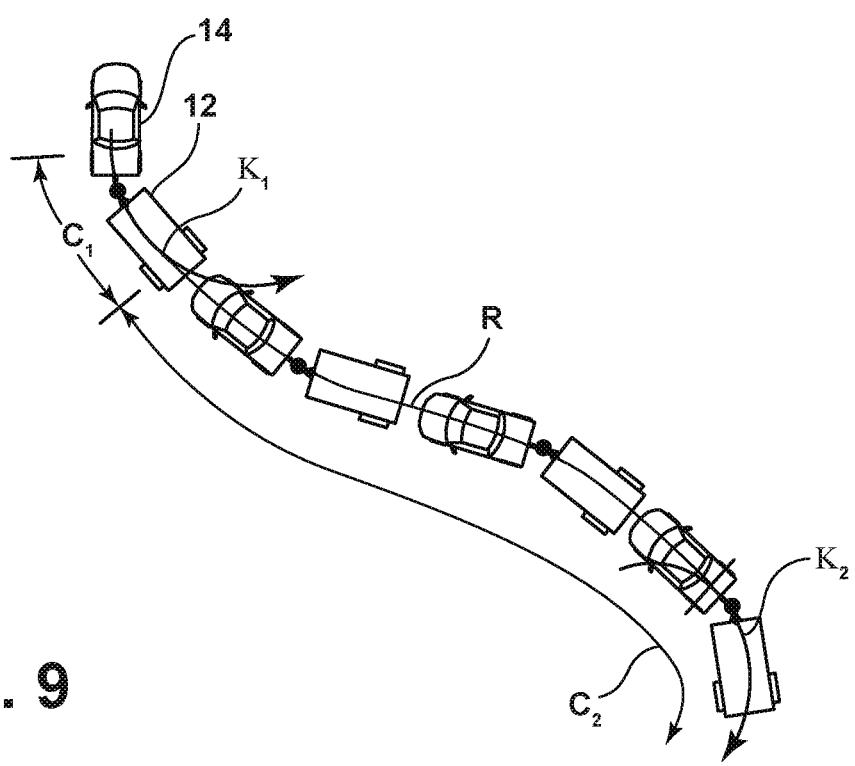
FIG. 9 is a further schematic view showing a vehicle backing a trailer along an alternative path including multiple curvatures with an extended recovery period therebetween.

As further shown in FIG. 9, when the initially-commanded curvature $κ_1$, corresponding to the initial curvature command $C_1$, is relatively tight (i.e. such that a high hitch angle γ is maintained), a relatively longer recovery path R is traversed after entering a second curvature command $C_2$ in a direction opposite the first curvature command $C_1$, a significant portion of which may be in the direction of the first curvature command $C_1$. This effect is generally even more pronounced as trailer length D increases, with relatively longer trailers traversing a relatively long recovery path R (such as at least three lengths of vehicle 14). This can become a problem if the driver needs to change the direction of the trailer 12 multiple times within a limited amount of lateral space relative to the vehicle staring point or commands an initial curvature $κ_1$ without enough overall room to recover without requiring that vehicle 14 be driven forward.

To potentially help a driver avoid situations where there is inadequate room to recover from a commanded curvature κ, without restricting system 10 from allowing relatively tighter curvatures κ to be commanded, where adequate recovery space is available, system 10 may include a variation of knob 30 in a steering input device 18 similar to that which is described above with respect to FIGS. 5-7. In particular, the variation of knob 30 shown in FIGS. 10A and 10B may include a sequential multi-stage arrangement, in which knob 30 includes distinct sub-ranges of the overall movement separated by stops $S_1(R),S_1(L)$ and $S_2(R),S_2(L)$. In this manner, knob 30 is moveable within the first sub-range in either the left or right direction between the at-rest position P(AR), as described above, to the first stop $S_1(R)$ or $S_1(L)$, and in a second range beyond the first stop $S_1(R)$ or $S_1(L)$. In this manner, system 10 can be calibrated to utilize knob 30 such that curvatures κ within a range requiring a recovery path having an overall length below a predetermined threshold can be commanded by rotation of knob 30 within the lower range (the at-rest position P(AR) to the first stops $S_1(R),S_1(L)$). Further curvatures κ within a range requiring a recovery path having an overall length above the predetermined threshold may then be commanded by rotation of knob 30 within the higher sub-range (beyond the first stops $S_1(R),S_1(L)$). By this scheme, knob 30 provides the user with a tactile/haptic notification that a curvature κ is being requested that will require a longer distance for turn recovery. This can allow the user to evaluate the surroundings of vehicle 14 and trailer 12 to assess if the surroundings allow for such recovery before proceeding.

Further, in some implementations of system 10, controller 28 (FIG. 2) may estimate, by calculations performed during driving of the vehicle 14 and trailer 12 combination, for example, values for D and/or L, while allowing controller 28 to carry out operating routine 132 (FIG. 2), at the request of a user, using initial estimates for D and L, as needed. In such an implementation, system 10 may initially operate in a "startup" mode where conservative limits are placed on the threshold for curvature κ to help maintain the hitch angle γ sufficiently below the an actual, but yet unknown maximum controllable angle $γ_{max}$, which may also be referred to as a no-return angle, as such a hitch angle γ is above an angle that can be reduced by continued reversing of vehicle 14. The initial limits, however, may be conservative so as to restrict the operation of system 10 in backing trailer 12 below its actual capabilities given the actual values for D and L, for which sufficiently accurate estimates or values are not yet available. In this manner, system 10 by way of the knob 30 herein described can allow a user to exceed the initial limit imposed by system 10 to exceed the resulting curvature κ, if the user believes that doing so is possible and desirable. As described below, this action can be taken only upon a specific action of user by way of knob 30, such as a predetermined movement of knob 230, and may be accompanied by an indication or warning that the action may result in the hitch angle γ exceeding the critical angle $γ_c$, as discussed further below. In this manner, an "extended mode" of operation can include one in which a threshold is determined for "standard" operation based on one or both of a turn-recovery distance or maintaining curvature below a threshold that may result in the hitch angle γ exceeding the maximum controllable hitch angle $γ_{max}$ based on initial estimates for system parameters, including trailer length D and vehicle drawbar length L.

Returning to FIG. 8, and as can be understood based on the above description of the kinematic model underlying curvature routine 98 (FIG. 2), trailers 12 with a greater length D have comparatively greater recovery periods, which may be measured in time (recovery time) or distance (recovery distance) for similar curvatures κ. Accordingly, in one embodiment, controller 28 can generally determine a maximum degree of steady-state curvature that a vehicle 14 and trailer 12 combination can maintain, given a known or estimated length D of the particular trailer 12 coupled with vehicle 14, or an initial conservative estimate for length D, (given that other characteristics of vehicle 14, including the maximum steering angle δ, wheelbase W, drawbar length L, etc., are known and unchanging with respect to the particular vehicle 14 in which system 10 is included). In other words, controller 28 can determine a maximum curvature κ that corresponds with a steady-state maneuver of the vehicle 14 and trailer 12 combination at a maximum controllable hitch angle $γ_{max}$ at a low vehicle speed. Controller 28 can then derive a range of curvature, from zero (i.e. straight backing) to the determined maximum, and can assign this range to the range of movement of knob 30, which, as shown, is rotation between the at-rest position P(AR) and the end points of rotation E(R) and E(L), in the present example. Similar assignment can be made with respect to a joystick, a slider, or the like, which may be used to control a vehicle 14 and trailer 12 combination in a manner similar to that which is described herein. In a similar manner, a variation of knob 30 with capability to actively adjust the range of rotation thereof can adjust the endpoints of rotation of knob 30 based on a determination of the maximum degree of curvature in such conditions. Such a knob 30 can be similar to that which is described in co-pending, commonly-assigned U.S. patent application Ser. No. 14/878,227, the entire disclosure of which is incorporated by reference herein.

By assigning a set range of rotation, such as that which is employed by knob 30 as presently described, in a linear manner, the sub-range below the above-described first stops $S_1(R),S_1(L)$ will correspond proportionately to a particular curvature amount, at which point further movement of knob 30 may be, for example, temporarily obstructed such as by further rotational motion being restricted. Accordingly, the location of the first stops $S_1(R),S_1(L)$ can be positioned with respect to the overall range of rotation to correspond with a consistent proportion of the overall curvature determined by controller 28 for which the above-described indication of an extended recovery path will be needed and to accordingly separate the overall arrange of motion into the "normal" and "extended" sub-ranges. In another example, first stops $S_1(R)$, $S_1(L)$ can correspond with a curvature threshold based on an estimated or initial trailer length D and a corresponding estimated maximum controllable or controllable hitch angle $\gamma_{max}$, with a curvature $\kappa$ that calls for a hitch angle $\gamma$ in excess of the maximum controllable hitch angle $\gamma_{max}$ being considered a maximum returnable curvature, as once the curvature is achieved, the hitch angle $\gamma$ can no longer be reduced through reversing and, accordingly, trailer 12 cannot be returned to a straight backing path 121. As discussed above, combinations of the former and latter may also be used, such as in a standard mode, when trailer length D is known, and a startup mode, when trailer length D is set at an initial value. The proportion of sub-ranges can vary according to various considerations, including the overall responsiveness of system 10 and the length of recovery for which an indication or action is desired. In one embodiment, the first stops $S_1(R),S_1(L)$ can be located at about 50% of the total rotation range from the at-rest position P(AR) to the corresponding endpoint E(R),E(L). In other embodiments, the stops $S_1(R),S_1(L)$ can be located at about 66%, 75%, or more, of the total rotation range from the at-rest position P(AR) to the corresponding endpoint E(R),E(L) depending on the particular arrangement of knob 30, including the total number of stops included, as discussed further below.

As such, regardless of the amount of curvature $\kappa$ permitted by controller 28 to maintain the hitch angle $\gamma$ below the maximum controllable hitch angle $\gamma_{max}$, knob 30 may provide a haptic indication of an increased curvature recovery distance at a consistent proportional location within the available curvature. Because, generally speaking, system 10 will permit a lower degree of curvature $\kappa$ for longer trailers, while permitting a higher degree of curvature $\kappa$ for shorter trailers, and because longer trailers have longer recovery distances for comparatively similar curvatures, the proportion of curvature available above the first stops $S_1(R),S_1(L)$, when based on turn recovery, will generally correspond to comparable recovery lengths among different trailer lengths. In various embodiments, the above-described locations for first stops $S_1(R),S_1(L)$ can correspond to a recovery length of about three lengths of vehicle 14 (+/−one-half of a length of vehicle 14), for example. In various embodiments, controller 28 can determine the proportionality of the mapping of available curvature $\kappa$ to the range of motion for knob 30 according to various factors, including trailer length D (measured, estimated, or initial), drawbar length L, and others. In an example, controller 28 may employ a lookup table proving appropriate mapping characteristics based on such measurements. In a further example where drawbar length L is known and/or the only factor considered is trailer length D, such a lookup table can include mapping data dependent on the trailer length D, or controller 28 can utilize an equation mapping the available knob range to trailer length D. As an alternative a variation of the above-referenced adaptable knob 30 can also adjust the positioning of the first stops $S_1(R),S_1(L)$ according to a calculated recovery length threshold so as to be potentially more consistent among various trailer lengths D.

Turning to FIG. 11, a further example of a possible curvature $\kappa$ is shown that results in a hitch angle $\gamma$ that is greater than the maximum controllable hitch angle $\gamma_{max}$. In general, as discussed above, once the hitch angle $\gamma$ surpasses the maximum controllable hitch angle $\gamma_{max}$, the hitch angle $\gamma$ will continue to increase, regardless of the steering angle $\delta$, with continued reversing of vehicle 14 until such reversing stops or the collision angle $\gamma_c$ is reached. In such a condition, accordingly, the only possible recovery path is a forward-driving recovery path $R_F$, as shown in FIG. 11. However, depending, in particular, on the trailer length D, the convergence of hitch angle $\gamma$ to the collision hitch angle $\gamma_c$ may be slow enough such that trailer 12 may be reversed over a limited distance or time sufficient to allow a user to reverse trailer 12 along a curvature $\kappa$, according to the present example, to achieve a desired positioning of trailer 12 without resulting in a collision. In one example, such a time period may be greater than the reaction time of system 10 needed for system 10 to intervene (such as by actuating brakes 72) to avoid a collision. In another example, such a time period may be determined to be sufficient to allow a user to have reasonable time to avoid such a collision. Still further, such an action may be permitted when system 10 determines that a collision will not occur until after a predetermined threshold distance (e.g., one vehicle length). In a specific implementation of such an example, system 10 may require an actual value for trailer length D to have been entered into memory 86 or for controller 28 to have obtained an estimate for trailer length D determined to be reliable within a predetermined factor.

In particular, to allow a user to command a curvature $\kappa$ resulting in a hitch angle $\gamma$ above the maximum controllable hitch angle $\gamma_{max}$, the depicted steering input device 18 may include second stops $S_2(R),S_2(L)$ at a point of rotation of knob 30 at which the corresponding commanded curvature $\kappa$ is determined to cause the hitch angle $\gamma$ to exceed the maximum controllable hitch angle $\gamma_{max}$. In this manner, system 10 can require another specific action, including a repetition of the same action used to overcome the first stops $S_1(R)$, $S_1(L)$, to be performed by the user by way of knob 30 to request a curvature $\kappa$ corresponding to a knob position beyond second stops $S_2(R),S_2(L)$. As discussed above, the range of curvature commands C can be mapped to a static location of the second stops $S_2(R),S_2(L)$ in a similar manner described above with respect to the first stops $S_1(R),S_1(L)$ described above with the endpoints E(R), E(L) being positioned beyond second stops $S_2(R),S_2(L)$ and corresponding to a curvature command C corresponding with a vehicle curvature $\kappa$ that is determined to result in a hitch angle $\gamma$ greater than the maximum controllable hitch angle $\gamma_{max}$. In particular, the endpoints E(R),E(L) may be within a predetermined range of the curvature κ determined to result in a hitch angle γ exceeding the maximum controllable hitch angle $γ_{max}$, such as within 1 percent to 10 percent thereof. In a further example, when the difference between a curvature κ determined to result in a trailer vehicle collision (with a curvature κ that calls for a hitch angle γ resulting in a collision angle $γ_c$ being considered a maximum physical curvature) within a predetermined distance and the curvature corresponding to second stops $S_2(R), S_2(L)$ is less than the predetermined percentage, such functionality can be disabled and knob 30 can be configured such that stops $S_2(R)$, $S_2(L)$ effectively act as end points. Still further, an embodiment of system 10 using the knob 30 depicted in FIGS. 10A and 10B can omit second stops $S_2(R), S_2(L)$ and the accompanying excess curvature described herein, instead including only a single set of stops $S_1(R), S_1(L)$ followed by endpoints E(R), E(L). It is noted that the inclusion of the described stops $S_1(R)$, $S_1(L)$ and $S_2(R)$, $S_2(L)$ and the associated operation thereof can be utilized when backing trailers of different types, including conventional, rear-hitched trailers, gooseneck trailers, fifth-wheel arrangements and the like. In variations of system 10 wherein the particular control parameters vary for such different trailer types, different modes for operation within the various ranges can be provided by system 10 with control schemes using knob 30, as described below, being generally similar in either such mode.

As discussed above with respect to the variation of knob 30 shown in FIG. 5, knob 30, as shown in FIGS. 10A and 10B can be biased toward the at-rest position P(AR). In an embodiment this biasing can be a linear spring force rate of increase, wherein the force at which knob 30 is biased toward the at-rest position P(AR) increases linearly with the distance of movement away from the at-rest position P(AR) by a spring constant. In such an embodiment, the rate is the spring constant, and in the instance of the rotatable knob 30, described herein, the force is applied in a rotational manner as a biasing torque about the center of knob 30, although other arrangements are possible. Accordingly, in the illustrated embodiment, the rate of biasing is a linear increase in the torque needed to further rotate knob 30. In particular, this rate may remain constant as knob 30 is moved beyond first stops $S_1(R), S_1(L)$ and toward second stops $S_2(R), S_2(L)$ such that the particular movement of control knob 30, discussed below, is all that differentiates movement of knob 30 within the sub-range below or above first stops $S_1(R), S_1(L)$. In an alternative embodiment, the spring rate (actual or simulated) may be greater above second stops $S_2(R), S_2(L)$, resulting in the torque required for rotation of knob 30 increasing more with further rotation of knob 30, above first stops $S_1(R), S_1(L)$ in a similar manner to that which is described in co-pending, commonly-assigned U.S. patent application Ser. No. 15/141,309. In this manner, the spring biasing of knob 30 toward the at-rest position P(AR) can provide an indication to the user that system 10 will return the vehicle 14 trailer 12 combination to a straight backing path 114 (such as that shown in FIG. 6) should knob 30 be released. As discussed above with respect to FIG. 11, however, when knob 30 is turned past second stops $S_2(R), S_2(L)$, system 10 is not able to return to a straight backing path 114, this being only achievable by driving vehicle 14 forward. Accordingly, steering input device 18 can be further configured to retain knob 30 in the position from which it is released when in the sub-range beyond second stops $S_2(R), S_2(L)$.

Referring back to FIG. 8, along with FIGS. 10A and 10B, the above-described backing path of vehicle 14 reversing a trailer 12 can be achieved by implementing successive curvature commands $C_1$ (FIG. 10A) and $C_2$ (FIG. 10B) using knob 30. As a result, the portion of the backing path illustrated in FIG. 8 can include a first portion at which a first curvature $κ_1$ is realized, followed by a recovery portion R where system 10 works to achieve a second curvature κ2 corresponding to the second curvature command $C_2$. Such curvature $κ_2$ is achieved after a distance of the recovery portion R. As illustrated, the recovery path following the first curvature command $C_1$ is relatively short, i.e., less than three vehicle lengths. Accordingly, the rotational positioning of the knob 30 in calling for the first curvature command $C_1$ is below the corresponding first stop $S_1(R)$. In a similar manner, the second curvature command $C_2$ is also below first stop $S_1(L)$, indicating that a similarly-short recovery path will follow backing of trailer 12 along the corresponding second curvature $κ_2$, once achieved.

Figure 12:
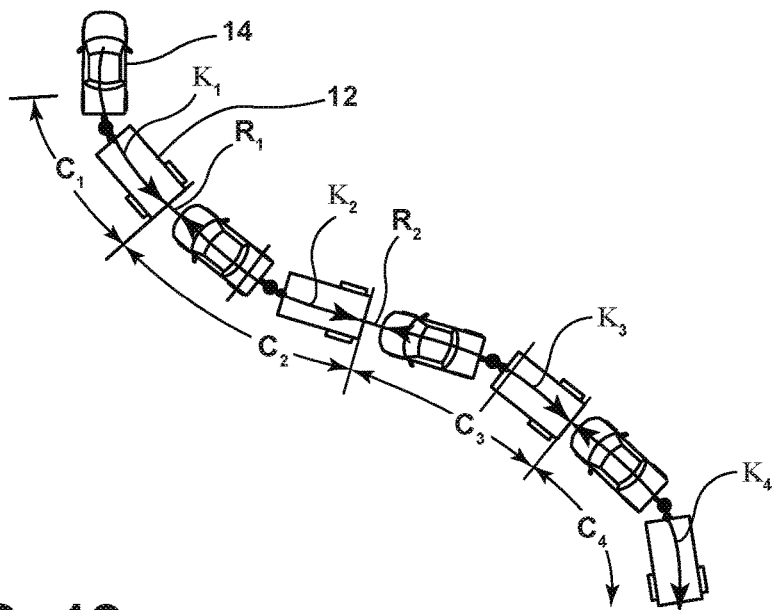
FIG. 12 is a further schematic view showing a vehicle backing a trailer along an alternative path including multiple curvatures with an extended recovery period therebetween.
Figure 13A:
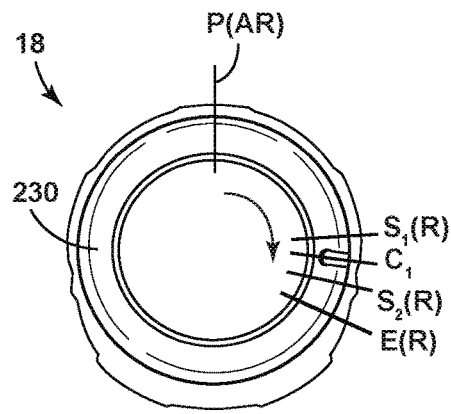
FIGS. 13A and 13B show the rotatable knob of FIGS. 10A and 10B during control of the vehicle and trailer combination of FIG. 12 along a first portion of the depicted path.
Figure 13B:
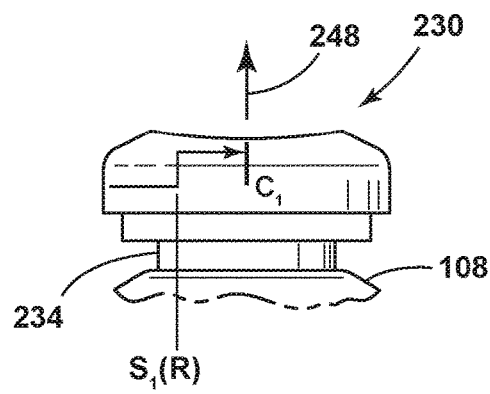

Turning to FIG. 12, along with FIGS. 13A-16B, a further backing path for vehicle 14, reversing trailer 12 is shown that is achieved by implementing successive curvature commands $C_1$ (FIG. 13A), $C_2$ (FIG. 14A), $C_3$ (FIG. 15A), and $C_4$ (FIG. 16A) using knob 230. The resulting backing path, illustrated in FIG. 12, includes a first portion at which the first curvature $κ_1$ is realized. As can be seen in FIG. 13A, the use of knob 230 to command curvature $C_1$ is beyond first stop $S_1(R)$, meaning that the curvature $κ_1$ realized requires a length of a recovery path associated therewith that is over the predetermined threshold (e.g., three lengths of vehicle 14). Accordingly, a specific action is required to be executed by way of knob 230 to turn knob 230 beyond first stop $S_1(R)$. As shown in FIG. 13B, in the present embodiment such action may be lifting of the knob 230 relative to the base 234 that mounts knob 230 to console 108. As illustrated, when knob 230 is turned to the location of first stop $S_1(R)$, further rotation is blocked (such as by interengagement with features of base 234 and knob 230, including a stepped track on base 234 engaged by a flange, pin, follower or the like) while knob 230 remains in the lowered position shown in FIG. 13B. In this manner, upon upward movement of knob 230 in direction 248, turning of knob 230 into and within the sub-range of movement beyond first stop $S_1(R)$ and toward second stop $S_2(R)$ is possible. As illustrated, steering input device 18 can be structured such that knob 230 remains in the raised position of FIG. 13B when positioned between first stop $S_1(R)$ and second stop $S_2(R)$, which can serve as an indication that a curvature within the corresponding extended range is being commanded. Alternatively, knob 230 can return (such as under a vertically downward spring biasing) to the lowered position when moved past first stop $S_1(R)$.

Figure 14A:
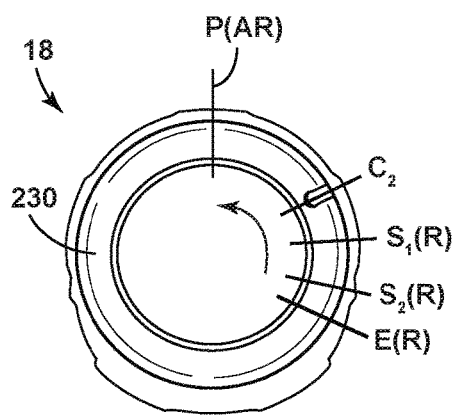
FIGS. 14A and 14B show the rotatable knob of FIGS. 10A and 10B during control of the vehicle and trailer combination of FIG. 12 along a second portion of the depicted path.
Figure 14B:
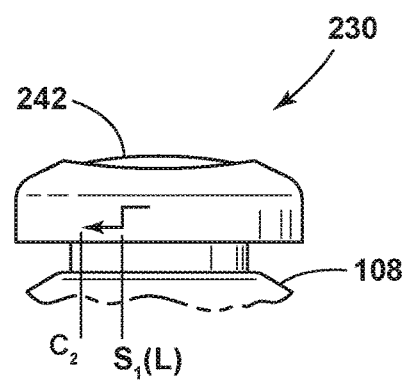

As further shown in FIGS. 12, 14A and 14B, a subsequent second curvature command $C_2$ is in the same direction as the first command $C_1$ and corresponds with a curvature $κ_2$ that is below the predetermined threshold. As a result, the position of knob 230 (FIG. 14A) in commanding curvature $κ_2$ is below first stop $S_1(R)$ such that knob 230 moves back past first stop $S_1(R)$ and in to the range therebelow, steering input device 18 being structured, for example, such that the movement over first stops $S_1(R), S_1(L)$ is not obstructed, allowing such rotation of knob 230 to be achieved by or augmented by the spring biasing thereof toward the at-rest position P(AR). As further illustrated, such movement can also include downward movement of knob 230 back into the lowered position, such as under a spring biasing force of the like. As further shown in FIG. 12, the backing path includes a recovery period $R_1$ over which the path reduces in curvature from $κ_1$ to $κ_2$. Accordingly, although a change in direction is not called for between the first curvature command $C_1$ and the second curvature command $C_2$, the driver of vehicle 14 may still benefit from the presence of first stop $S_1(R)$ in knowing that a somewhat longer recovery length $R_1$ is needed in reducing the curvature from the initial curvature $\kappa_1$.

Continuing with reference to FIG. 12, command $C_3$ calls for a change in direction from curvature $\kappa_2$, resulting in a second recovery period $R_2$ for the curvature to reach the commanded curvature $\kappa_3$ corresponding to that of the curvature command $C_3$. As shown in FIGS. 15A and 15B, the third curvature command $C_3$ corresponds with curvature $\kappa_3$ that is also below the predetermined threshold. As a result, the position of knob 230 used in commanding curvature $\kappa_3$ is below the corresponding first threshold $S_A(L)$ such that knob 230 rotates freely from the position of FIG. 14A to the position of 15A. Subsequently, a fourth curvature command $C_4$ can be entered (FIG. 16A) that calls for an increased curvature $\kappa_4$ in the same direction as curvature $\kappa_3$. As shown, the curvature command $C_4$ is beyond both first stop $S_1(L)$ and second stop $S_2(L)$, thereby requiring the user to lift knob 230 upward for turning thereof into the sub-range above $S_1(L)$ until it reaches second stop $S_2(L)$, at which point further movement of knob 230 is again restricted, requiring the user to again raise knob 230 in the vertical direction 248 to move knob 230 beyond second stop $S_2(L)$ and into the range of movement thereabove. As discussed above, because recovery from the curvature $\kappa_4$ corresponding with the commanded curvature $C_4$ cannot be accomplished by system 10 under further backing of vehicle 14, further changes to the curvature path $\kappa$ are not possible without deactivating system 10. In this manner, as discussed above, upon release of knob 230, knob 230 may remain in the position shown in FIGS. 16A and 16B. This can be accomplished by knob 230 engaging a clutch or other such feature coupled between knob 230 and base 234 when knob 230 is moved past second stop $S_2(L)$. In this manner, knob 230 can also be restricted from movement toward the at-rest position P(AR) from the position shown in FIGS. 16A and 16B, including under the force of the user to indicate that any curvature commands resulting from such attempted movement are not possible. System 10 can continue steering the vehicle 14 and trailer 12 combination along the portion of the path corresponding with curvature $C_4$ until trailer 12 moves within a predetermined collision range or through a predetermined distance (such as one vehicle length or the like). It is noted that the movement of knob 230 in vertical direction 248 to move knob 230 past first stops $S_1(R)$, $S_1(L)$ and second stops $S_2(R)$, $S_2(L)$ can vary therebetween to give an indication to user of which stop knob 230 is being moved past. In one example the vertical distance 248 needed to move past first stop $S_1(R)$, $S_1(L)$ can be less than that needed to move knob 230 past second stop $S_2(R)$, $S_2(L)$. Further, knob 230 can return to or toward the lowered position after moving past first stops $S_1(R)$, $S_1(L)$ but may remain in the raised position after moving past second stops $S_2(R)$, $S_2(L)$.

FIG. 17 shows an alternative arrangement for knob 330 similar to the dynamic haptic knob discussed above and in the referenced Ser. No. 15/141,309 application. In particular, steering input device 18 can include an electromechanical element 346, such as a motor or the like, that is coupled with knob 330 by way of a mechanical link 358 and is anchored to base 334, can provide an opposing force against user movement of knob 330 to slow or obstruct movement thereof. In this manner, an associated steering input device 18 can electromechanically simulate the first and second stops $S_1(R)$, $S_1(L)$ and $S_2(R)$, $S_2(L)$, as well as endpoints E(R), E(L) at positions that can be dynamically adjusted based on the available range of curvature $\kappa$ provided by the particular vehicle 14 trailer and 12 combination (including the trailer length D, for example). Because the stops $S_1(R)$, $S_1(L)$ and $S_2(R)$, $S_2(L)$ are not physical, an alternative movement can be used to move knob 330 past stops $S_1(R)$, $S_1(L)$ and $S_2(R)$, $S_2(L)$. For example, when knob 330 is turned such that first stop $S_1(R)$, $S_1(L)$ is encountered, causing system 10 to control the electromechanical element 346 such that the first stop $S_1(R)$, $S_1(L)$ is implemented by a force opposing further movement, the user can perform a tapping motion in which knob 330 is turned back toward the at-rest position P(AR) slightly before turning back to first stop $S_1(R)$, $S_1(L)$, at which point system 10 interprets this as the required motion and causes electromechanical element 346 to stop restricting movement of knob 330 away from the at-rest position P(AR) by removing the opposing force. System 10 can behave similarly when knob 330 is moved to the determined location for second stops $S_2(R)$, $S_2(L)$. In a further example, system 10 can require a double-tap or the like to allow movement beyond second stops $S_2(R)$, $S_2(L)$. Still further, system 10 can cause electromechanical element 346 to restrict movement of knob 330 toward the at-rest position P(AR) and can also continue to move knob 330 toward the corresponding end point E(R), E(L) as the hitch angle $\gamma$ continues to increase.

Figure 18:
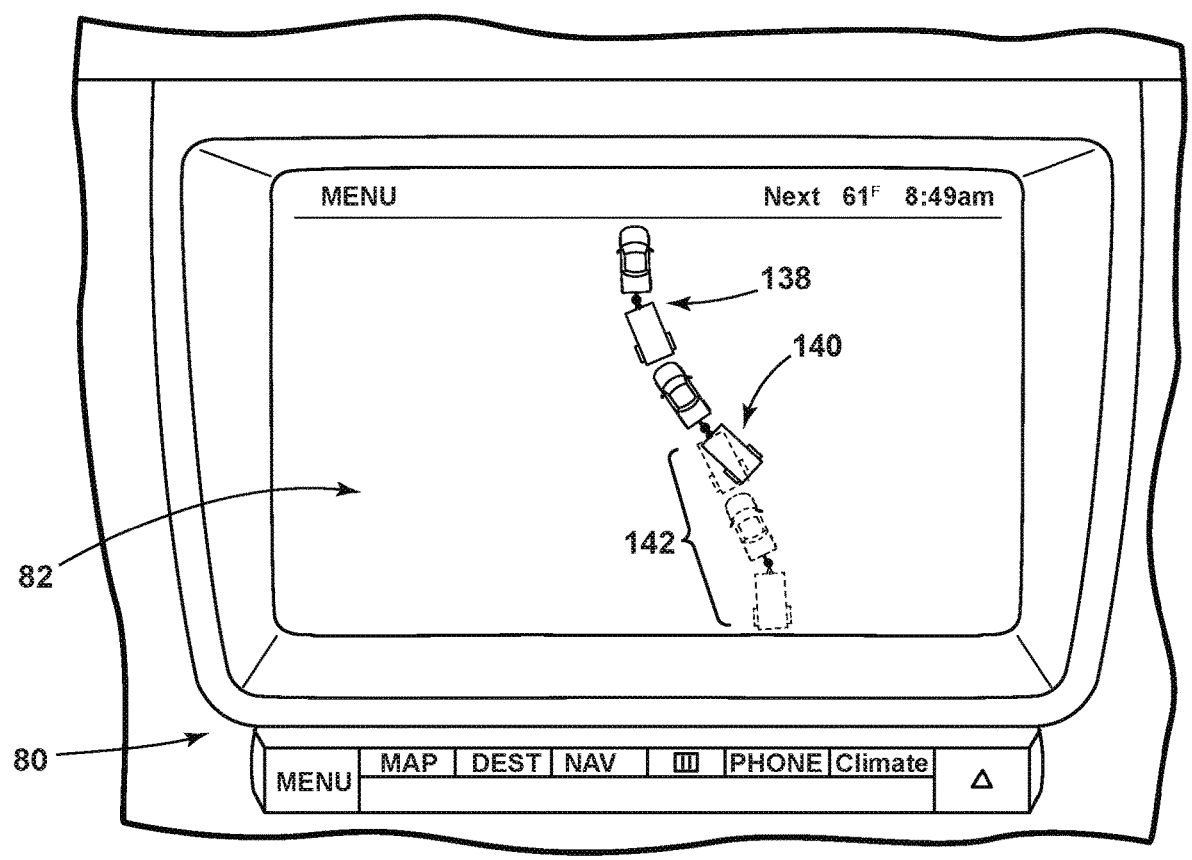
FIG. 18 is a front-perspective view of a vehicle human-machine interface indicating a mode of operation according to an aspect of the disclosure.

As shown in FIG. 18, system 10 can also use the above-described HMI 80 to present notification and or warnings related to the above-described movement of knob 30 within the sub-ranges of movement separated by stops $S_1(R)$, $S_1(L)$ and $S_2(R)$, $S_2(L)$. In particular, system 10 can allow a user-selected, uninterrupted, operation of HMI 80, including of display 82 when system 10 is operating with a curvature commanded by a knob 30 position below first stops $S_1(R)$, $S_1(L)$. This may include use of display 82 to view information related to other systems or functions of vehicle 14, including media or the like. When the display 82 is used to view information related to system 10 in such a condition, a representation 138 of the vehicle 14 and a representation 140 of trailer 12 can be presented in green and/or a text-based message may indicate that system 10 is operating in "standard mode", for example. When knob 30 is moved past first stops $S_1(R)$, $S_1(L)$, system 10 can indicate operation in an "extended mode" either by a text-based indication or by presenting representations 138, 140 in yellow, for example. As illustrated, a predicted recovery path 142 may also be presented, as described in co-pending, commonly assigned U.S. patent application Ser. No. 15/146,933. It is noted that, in some uses of the so-called "extended mode", including those using preliminary values or initial estimates for trailer length D, the hitch angle $\gamma$ may increase beyond the maximum returnable angle $\gamma_{max}$. At this point, system 10 may detect that the hitch angle $\gamma$ is increasing unexpectedly indicating an excess hitch angle $\gamma$ condition. Upon such an occurrence, system 10 may further indicate that vehicle 14 must be manually pulled forward to decrease the hitch angle $\gamma$ before the standard mode can be resumed.

Similarly, when knob 30 is moved beyond second stops $S_2(R)$, $S_2(L)$, system 10 may present on display 82 an indication that a "no return" operation is being executed. This indication can, again, include a text-based message and can further or alternatively include a depiction of the vehicle 14 trailer 12 combination in red, for example. System 10 can, additionally, present an indication of the remaining distance for which system 10 will allow continued reversing of trailer 12 and/or a predicted distance or angle before collision. Should the hitch angle $\gamma$ increase during such operation to the point where system 10 intervenes, such as by braking or the like, to prevent a collision of trailer 12 with vehicle 14, an indication of such intervention can also be presented, along with an indication that system 10 must be deactivated and that vehicle 14 must be driven forward to resume operation of system 10 and to avoid a collision with trailer 12.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A steering input device for a trailer backup assist system, comprising:
   a control element moveable away from a center position sequentially through a first sub-range of movement to a first stop and a second sub-range of movement past the first stop, wherein movement of the control element past the first stop is permitted upon a first predetermined movement of the control element; and
   a controller determining a maximum control limit and a recovery limit based on a length of a trailer being backed by the system and calibrating a position signal of the control element such that the first stop corresponds with the recovery limit and the and the maximum control limit corresponds with an end of the second sub-range of movement, the controller further generating a vehicle steering command based on a position of the control element.

2. The steering input device of claim 1, wherein the vehicle steering command is configured to cause turning of steered wheels of a vehicle and is derived to move a trailer being reversed by the vehicle to a path having a curvature corresponding to a position of the control element, the curvature increasing from a zero curvature to the a calculated maximum controllable curvature with movement of the control element from the center position through the first and second sub-ranges.

3. The steering input device of claim 2, wherein the first sub-range corresponds to a first range of curvature below the recovery limit and the second sub-range corresponds to a second range of curvature above the recovery limit.

4. The steering input device of claim 2, wherein the controller sets the recovery limit at a curvature that corresponds with the trailer length and decreases with an increase in the trailer length.

5. The steering input device of claim 4, wherein the recovery limit is based on a calculated relationship between the first and second ranges of curvature commands and a turn recovery distance.

6. The steering input device of claim 1, wherein the predetermined movement is movement of the control element from a lowered position to a raised position, the control element being aligned with and rotationally restricted by the first stop when in the lowered position and moveable into the second sub-range when in the raised position.

7. The steering input device of claim 1, wherein the input device further includes an electromechanical element coupled with the control element, the electromechanical element providing a force to define the first stop when the control element reaches the end of the first sub-range and removing the force upon the predetermined movement of the control element.

8. The steering input device of claim 1, wherein:
   the control element is movable to a second stop at the end of the second sub-range and is further moveable past the second stop, on a second predetermined movement of the control element, and through a third sub-range beyond the second sub-range; and
   the controller further determines an extended control limit beyond the maximum control limit and further calibrates the position signal of the control element such that an end of the third sub-range corresponds with the extended control limit.

9. The steering input device of claim 8, wherein:
   the vehicle steering command is configured to cause turning of steered wheels of a vehicle and is derived to move a trailer being reversed by the vehicle to a path having a curvature corresponding to a position of the control element, the curvature increasing from a zero curvature to a calculated maximum controllable curvature with movement of the control element from the center position through the first and second sub-ranges; and the third sub-range corresponds to a curvature beyond the maximum controllable curvature to a physical maximum curvature.

10. The steering input device of claim 8, wherein;
the control element is biased toward the center position when within the first and second sub-ranges; and
the control element maintains a release position when in the third sub-range.

11. A backup assist system for a vehicle reversing a trailer, comprising:
a control element moveable away from a center position sequentially through a first sub-range of movement to a first stop, a second sub-range of movement past the first stop to a second stop, and a third sub-range of movement past the second stop, wherein movement of the control element past the first stop is permitted upon a first predetermined movement of the control element and movement of the control element past the first stop is permitted upon a first predetermined movement of the control element; and
a controller determining an intermediate recovery limit, a maximum controllable limit, and an extended physical limit based on a length of a trailer being backed by the system and calibrating a position signal of the control element such that the first stop corresponds with the intermediate recovery limit, the and the maximum control limit corresponds with the second stop, and the extended physical limit corresponds with an end of the third sub-range of movement, the controller further generating a vehicle steering command based on a position of the control element.

12. The system of claim 11, wherein the vehicle steering command is configured to cause turning of steered wheels of a vehicle and is derived to move a trailer being reversed by the vehicle to a path having a curvature corresponding to a position of the control element, the curvature increasing from a zero curvature to a calculated maximum controllable curvature with movement of the control element from the center position through the first, second, and third sub-ranges.

13. The system of claim 12, wherein the first sub-range corresponds to a first range of curvature below the recovery limit and the second sub-range corresponds to a second range of curvature above the recovery limit.

14. The steering input device of claim 13, wherein the controller sets the recovery limit at a curvature that corresponds with the trailer length and decreases with an increase in the trailer length.

15. The steering input device of claim 14, wherein the recovery threshold is based on a calculated relationship between the first and second ranges of curvature commands and a turn recovery distance.

16. The steering input device of claim 12, wherein the physical recovery limit corresponds with a trailer curvature resulting in a jackknife condition of the trailer relative to the vehicle.

17. A vehicle comprising:
a steering system including a pair of steered wheels;
a control element moveable away from a center position sequentially through a first sub-range of movement to a first stop and a second sub-range of movement past the first stop, wherein movement of the control element past the first stop is permitted upon a first predetermined movement of the control element; and
a controller determining a maximum control limit and a recovery limit based on a length of a trailer being backed by the system and calibrating a position signal of the control element such that the first stop corresponds with the recovery limit and the and the maximum control limit corresponds with an end of the second sub-range of movement, the controller further generating a steering command based on a position of the control element;
wherein the steering command is configured to cause turning of the steered wheels and is derived to move a trailer being reversed by the vehicle to a path having a curvature corresponding to a position of the control element, the curvature increasing from a zero curvature to the a calculated maximum controllable curvature with movement of the control element from the center position through the first and second sub-ranges.

18. The vehicle of claim 17, wherein the first sub-range corresponds to a first range of curvature below the recovery limit and the second sub-range corresponds to a second range of curvature above the recovery limit.

19. The vehicle of claim 17, wherein:
the controller sets the recovery limit at a curvature that corresponds with the trailer length and decreases with an increase in the trailer length; and
the recovery limit is based on a calculated relationship between the first and second ranges of curvature commands and a turn recovery distance.

20. The vehicle of claim 17, wherein:
the control element is movable to a second stop at the end of the second sub-range and is further moveable past the second stop, on a second predetermined movement of the control element, and through a third sub-range beyond the second sub-range;
the controller further determines an extended control limit beyond the maximum control limit and further calibrates the position signal of the control element such that an end of the third sub-range corresponds with the extended control limit; and
the third sub-range corresponds to a curvature beyond the maximum controllable curvature to a physical maximum curvature.

\* \* \* \* \*